May 17, 1966 S. L. FISHER 3,251,435
SINGLE LEVER THROTTLE AND SHIFT CONTROL MECHANISM
Filed Jan. 20, 1964 5 Sheets-Sheet 1
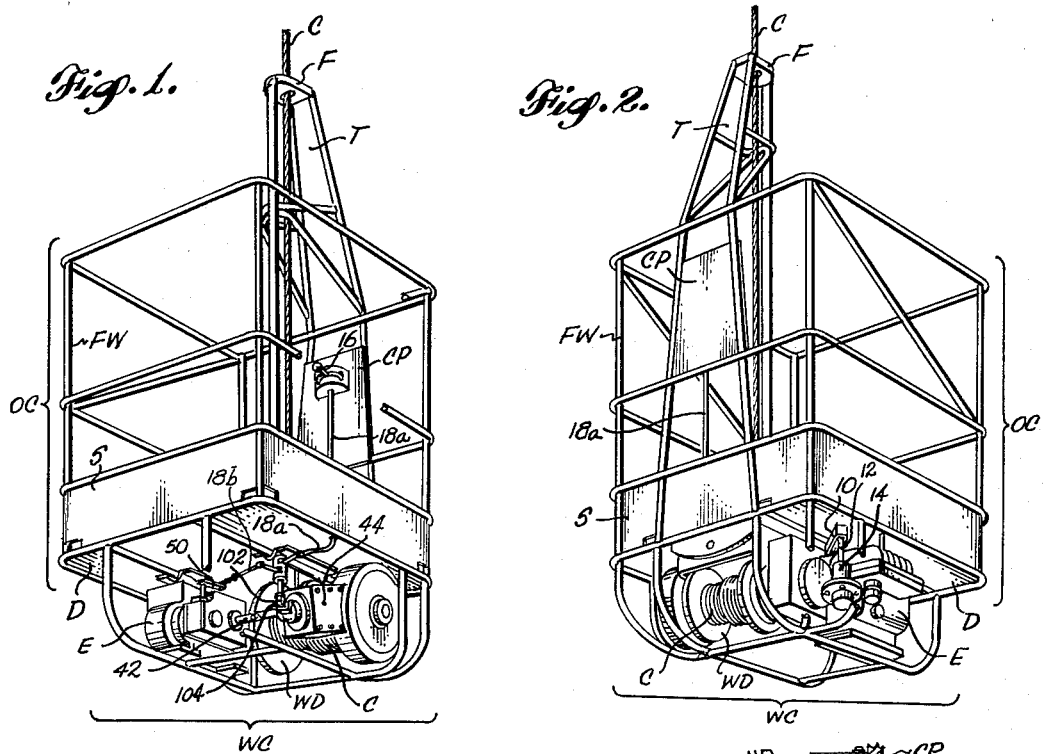
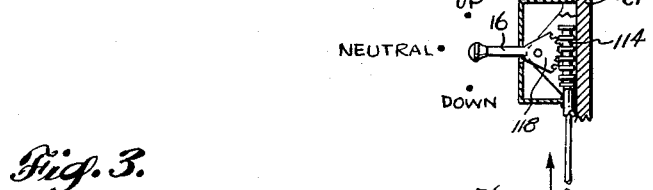
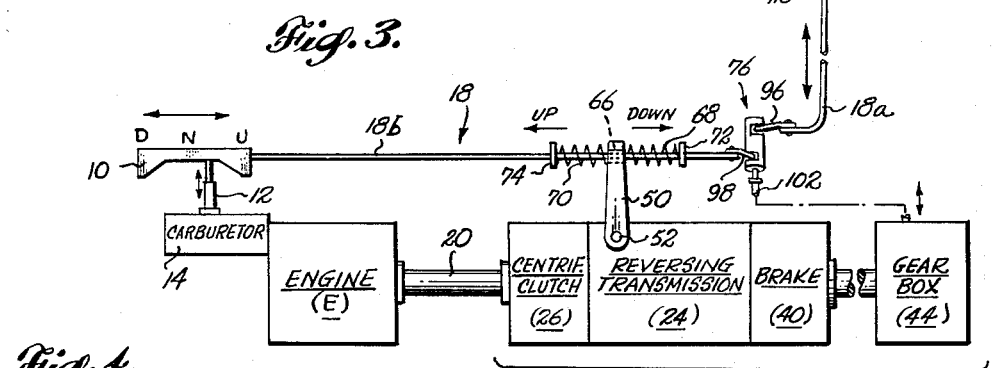
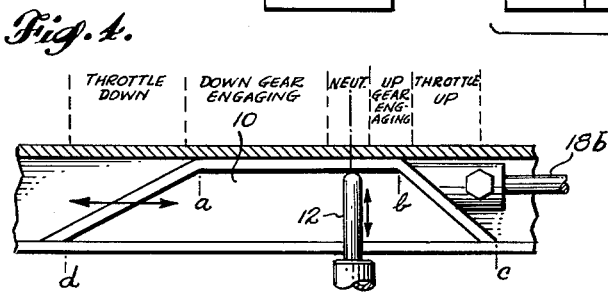
INVENTOR.
SIDNEY L. FISHER
BY Mathis & Graybeal
ATTORNEYS

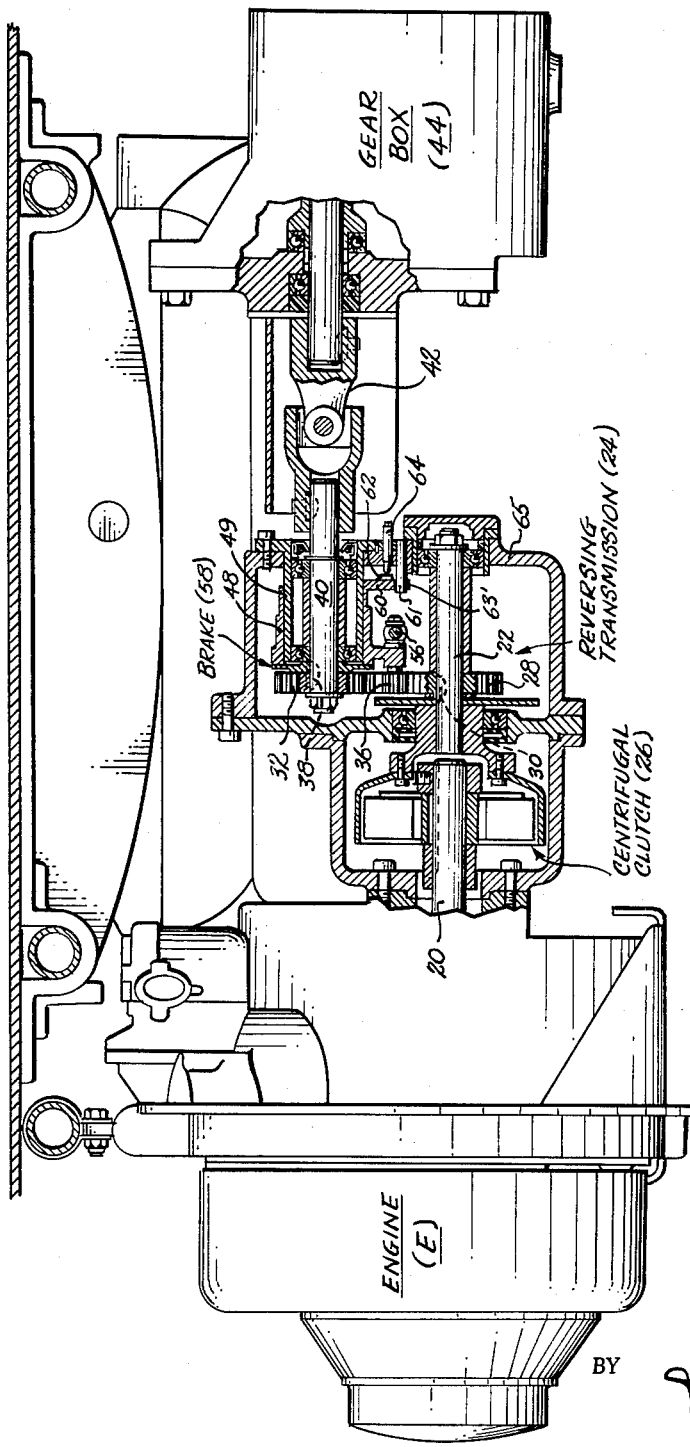

May 17, 1966 S. L. FISHER 3,251,435
SINGLE LEVER THROTTLE AND SHIFT CONTROL MECHANISM
Filed Jan. 20, 1964 5 Sheets-Sheet 3

INVENTOR.
SIDNEY L. FISHER
BY Mathis & Graybeal
ATTORNEYS

May 17, 1966  S. L. FISHER  3,251,435
SINGLE LEVER THROTTLE AND SHIFT CONTROL MECHANISM
Filed Jan. 20, 1964  5 Sheets-Sheet 4
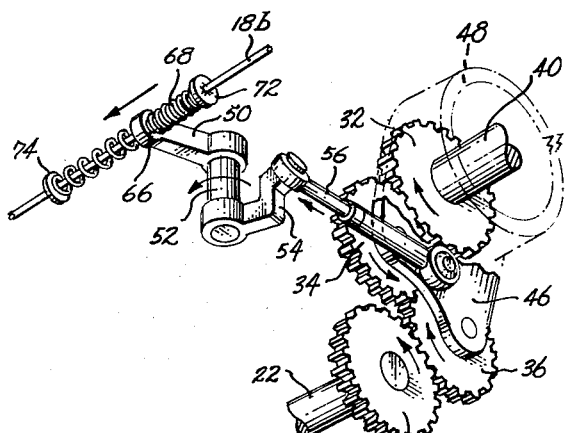
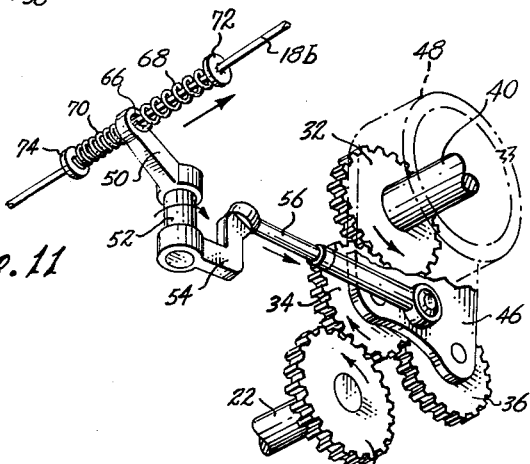
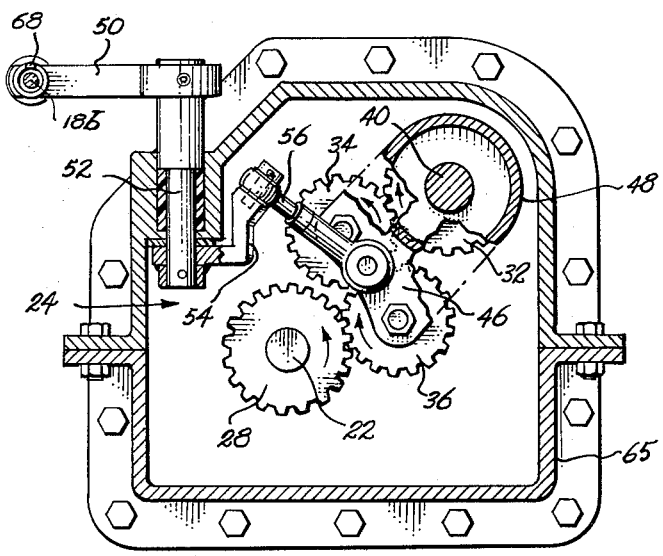
INVENTOR.
SIDNEY L. FISHER
BY
ATTORNEYS May 17, 1966 S. L. FISHER 3,251,435
SINGLE LEVER THROTTLE AND SHIFT CONTROL MECHANISM
Filed Jan. 20, 1964 5 Sheets-Sheet 5

INVENTOR.
SIDNEY L. FISHER
BY Mathis & Graybeal
ATTORNEYS

# United States Patent Office 3,251,435
Patented May 17, 1966

3,251,435
SINGLE LEVER THROTTLE AND SHIFT CONTROL MECHANISM
Sidney L. Fisher, Renton, Wash., assignor to Spider Staging, Inc., Renton, Wash., a corporation of Washington
Filed Jan. 20, 1964, Ser. No. 338,759
21 Claims. (Cl. 182—142)

The present invention relates to the control of gas engines, and more particularly to an improved and simplified mechanism for sequentially operating the throttle and reversing transmission of an engine by a single control lever.

An engine control mechanism according to the invention is essentially characterized by a single control lever mechanically connected to both a throttle cam and a shift lever. The operator moves the control lever to in turn move the shift lever for controlling gear engagement and the direction of drive, and the throttle cam for controlling fuel delivery to the engine and the speed of drive.

By way of typical example, one field of use of such a throttle mechanism is with respect to gas engine driven suspended staging mechanisms.

Staging mechanisms of the type shown in Fisher U.S. Patents Nos. 2,112,837 and 2,998,094 comprise a caged platform suspended by a single cable. The lower end of the suspension cable is attached to a power driven winch carried by the staging. In use of such a staging for cleaning, repairing, painting, etc., of the side of a building, the superstructure of a bridge, or the like, the upper end of the cable is secured to an overhead anchorage, and the staging is moved up or down alongside the building, bridge, etc., by winding or unwinding the cable onto or off from the winch drum.

The foregoing patents contemplate that the prime mover for the winch drum of the staging can be an internal combustion engine. This is advantageous because the use of an internal combustion engine or other type of gas engine makes the staging self-contained. The drive mechanism requires no outside energy source stationed on the ground or elsewhere and a conductor extending between the energy source and the staging, such as are required when the winch drum is driven by an electric, air, or hydraulic motor, for example. Since a staging mechanism equipped with the gas engine is self-contained, it can be taken into areas where electricity is not readily available and it is impossible or impractical to use either a compressed air or a hydraulic system.

In suspended stagings powered by gas engines it is essential that the engine control mechanism be as simple as possible. It is also highly desirable that it be possible to change from full speed upward movement to full speed downward movement almost instantaneously. In connection with such rapid reversal from full speed upward movement to full speed downward movement, it is essential for the safety of the engine and other power plant equipment, that the supply of fuel be reduced to a minimum during the limited neutral position of the reversing gear mechanism to avoid racing of the engine at that point with the consequent undue wear on the reversing gear mechanism. Accordingly, it is a principal object of the present invention to provide an improved single lever throttle and shift control mechanism for controlling the shifting of transmission gears and the throttle of a gas engine in such a manner that the throttle remains at idling speed until shifting to forward or reverse position has been effected, and thus avoid racing of the engine during the period of shifting. When the control mechanism is actuated to shift from forward or reverse operating position back into neutral, the invention provides for the initial movement of the throttle to idling position after which the gears are shifted to neutral position. Thus, the gears may be quickly shifted from neutral to forward or reverse and back again, from forward to reverse, and from reverse to forward without delay and without damage to the transmission.

The present invention provides coordinated control of the throttle and transmission through the entire range of operation. The throttle cam and the shift lever are both displaced substantially simultaneously by movement of the control lever. The shift lever is displaced to engage the transmission gears in either forward or reverse during the initial movement of the control lever. The shift lever is then operatively disconnected from the influence of the control level when the same is further moved to advance the throttle. As the control lever is returned to neutral, the control linkage effects a closing of the throttle and then reversely pivots the shift lever to disengage the gearing from forward or reverse drive position.

In the control mechanism according to the invention, the throttle control means includes a throttle cam suitably mounted for rectilinear translation in the vicinity of the engine throttle valve. The throttle cam includes a cam surface directed toward the throttle valve. A cam follower, operatively connected to the throttle valve, rides the cam surface and is influenced or moved thereby in response to a displacement of the throttle cam by the control lever through the intermediacy of the control linkage so as to in turn open or close the throttle valve.

According to the invention, a centrifugal clutch is located between the output shaft of the engine and the input shaft of the reversing transmission. During the shift phases and when the transmission is in neutral, the engine is idling and the rotational speed of the output shaft is insufficient to cause engagement of the centrifugal clutch. Thus, the engine is drivingly disconnected from the reversing transmission during the shift phases. The reversing transmission includes a brake that is actuated when the transmission is shifted to neutral to stop rotation of the output shaft of the transmission. Thus, movement of the control lever to neutral essentially immediately stops movement of the winch drum or other device to which the output shaft of the transmission is drivingly connected.

Other objects, features, and advantages of the present invention include the provision of an overload relief mechanism in the control linkage especially adapted to be actuated when an overload condition occurs to disconnect the throttle cam and the shift lever from the influence of the control lever. Thereafter the throttle cam and the shift lever are automatically and substantially immediately returned to their idle and neutral positions, respectively, and the motion of the transmission output shaft is stopped. Thus, the overload relief mechanism is a power stop device providing an automatic safeguard against overloads and resulting excessive strains on the engine and transmission parts. It is a tripping mechanism so constructed and arranged that it connects together a control lever portion and the throttle cam and shift lever portion of the control linkage under normal conditions but disconnects such portions of the control linkage if resistance and strain become excessive. By way of typical example, the engine and transmission parts of a suspended staging mechanism can become overloaded by the staging mechanism being caught under and stopped by a projecting portion of a bridge, building, or the like, as the staging mechanism is being driven upwardly adjacent thereto. When such an event occurs, the staging mechanism is held against further movement, but the engine continues to drive the winch drum, and the tendency of the winch drum is to climb the suspension cable and at the same time pull itself loose from its mounting. According to the invention, the engine transmission assembly is mounted onto the staging frame in such a manner that it is displaced upwardly slightly in response to the engine torque during such a period when the staging is held against movement but the engine continues to drive the winch drum. The overload relief mechanism is operatively connected to the transmission assembly and adapted to be moved to its control linkage disconnect position in response to a predetermined upward displacement of the transmission assembly. The throttle cam and shift lever are than almost immediately separated from the influence of the control lever, and the throttle is automatically returned to idle and the transmission shifted to neutral, and the transmission output shaft and winch drum connected thereto are braked to a stop.

These and other objects, features, characteristics and advantages pertaining to and inherent in the present invention will be apparent from the following description of a typical and therefore non-limitive embodiment thereof, as illustrated in the accompanying drawings, wherein like numerals refer to like parts, and wherein:

FIG. 1 is a perspective view taken from below and toward the front and one side of a suspended staging, incorporating a gas engine power plant and a single lever throttle and shift control mechanism therefor, constructed according to the present invention;

FIG. 2 is a perspective view of the staging shown in FIG. 1, taken from below and toward the rear and the opposite side of the staging;

FIG. 3 is a diagrammatic and schematic illustration of the single lever throttle and shift control mechanism of the present invention;

FIG. 4 is a cross-sectional view, on an enlarged scale, of the throttle cam and cam follower portions of the control mechanism shown in FIG. 3;

FIG. 5 is a view, partly in elevation and partly in section, of the power plant assembly, such view showing the centrifugal clutch, the reversing transmission, and the brake thereof in section;

Figure 7:
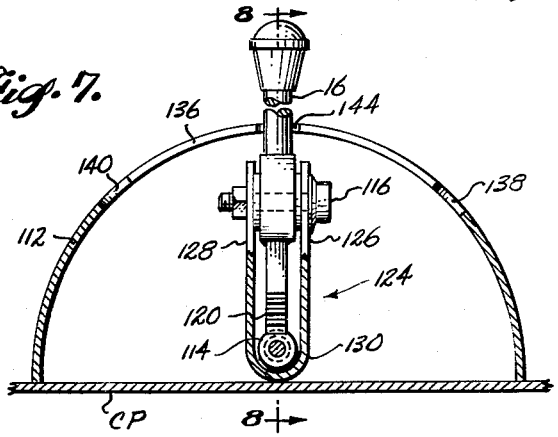
Figure 8:
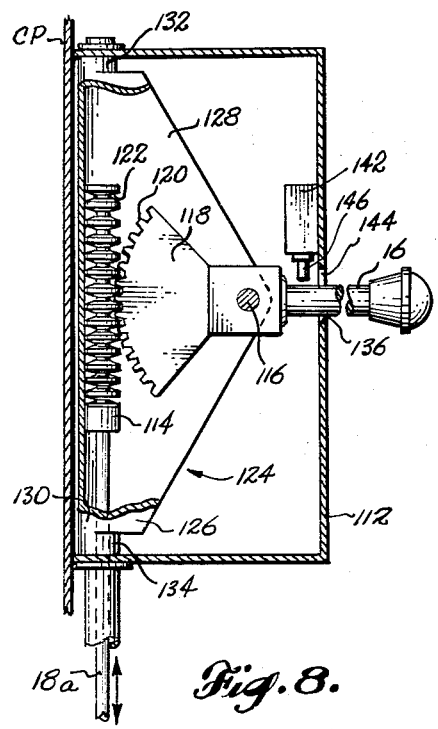
Figure 6:
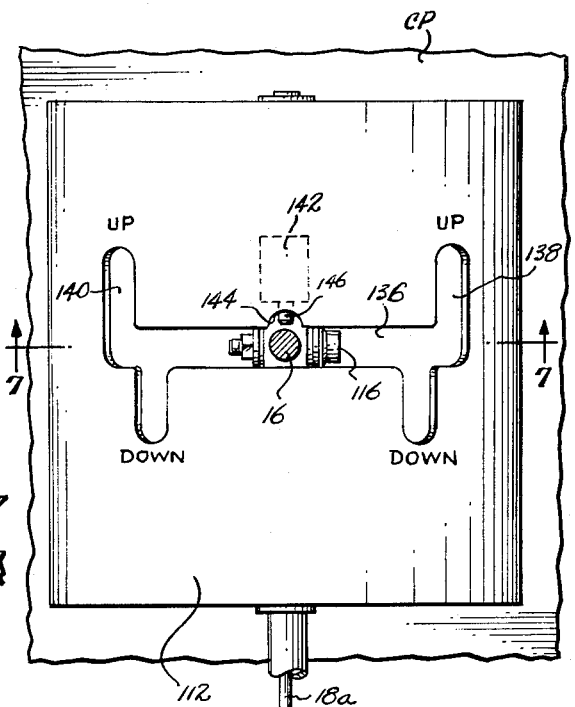
Figure 16:
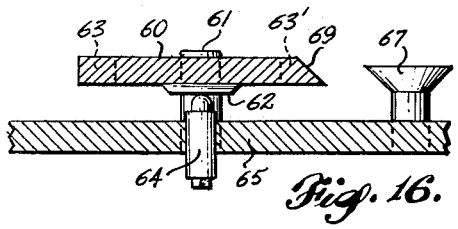
Figure 17:
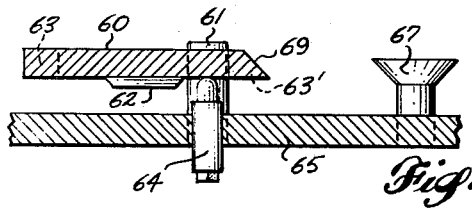
Figure 18:
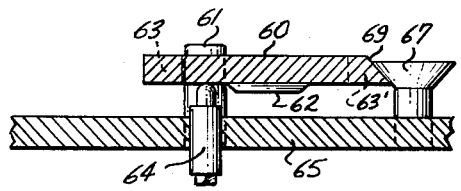
Figure 12:
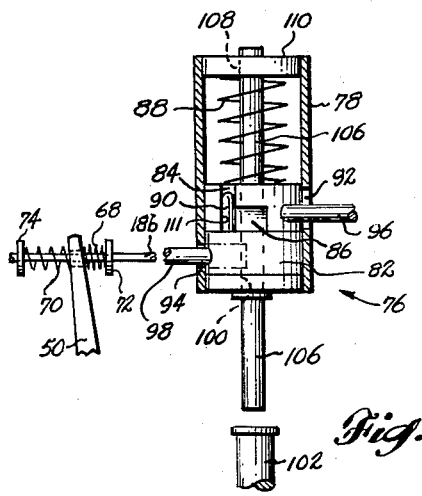
Figure 13:
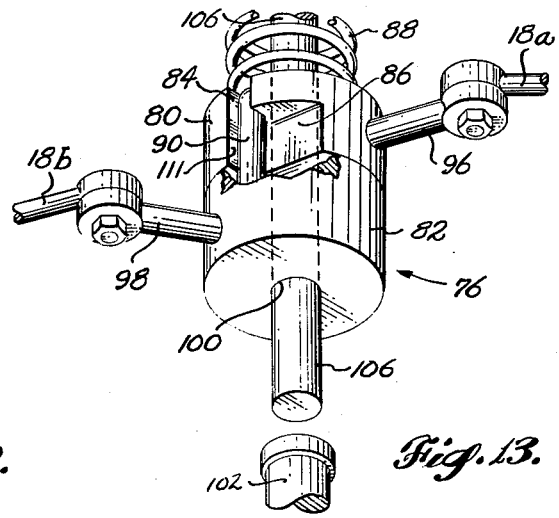
Figure 14:
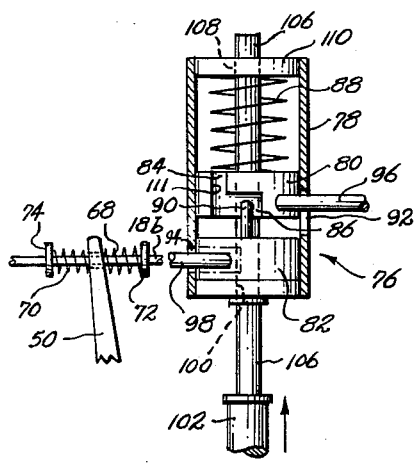
Figure 15:
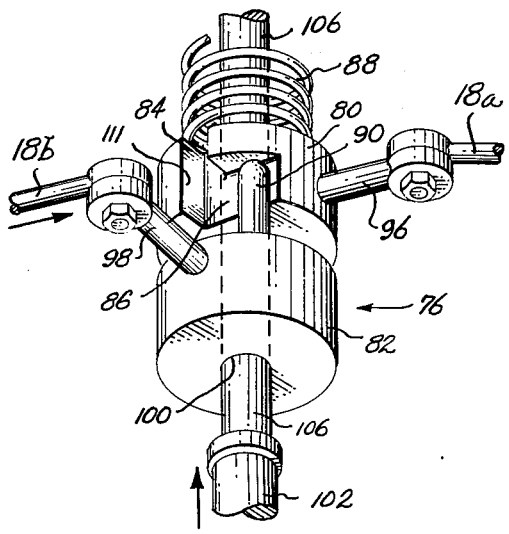

FIG. 6 is a front elevational view of the control lever housing, with the control lever being shown in section for clarity of illustration, such view showing the two selectively usable sets of vertical slots formed in the housing for accommodating the control lever during movement of the same in either the up or down directions for influencing the direction and/or speed of travel of the staging, such view also showing the horizontal slot formed in such housing for accommodating the control lever during movement of the same from one set of vertical slots to the other, such horizontal slot interconnecting the neutral position portions of the two sets of vertical slots, and such view also showing a shut-off switch, adapted to be contacted and operated by the control lever for opening the ignition circuit and in that manner stopping the engine when such is desired;

FIG. 7 is a view taken through the control lever housing substantially along line 7—7 of FIG. 6 and showing the control lever assembly in bottom plan;

FIG. 8 is a side view, partly in section and partly in elevation, of the control lever housing shown in FIGS. 6 and 7, such view presenting the housing itself in section, the section being taken substantially along line 8—8 of FIG. 7, and showing the control lever assembly therein in side elevation, with the foreground side wall of the pivotally mounted control lever carrier being broken away for clarity of illustration;

FIG. 9 is an internal view of the housing for the reversing transmission, showing the working components of the transmission in side elevation, with gear engagement shown being that for movement in the up direction;

FIG. 10 is a perspective view of the working components of the shifting transmission, such view showing the engagement of the gears when movement is in the up direction;

FIG. 11 is a view similar to FIG. 10, but showing the manner of engagement of the gears when movement is in the down direction;

FIGS. 12–15 are views of the overload relief mechanism in its two positions of operation, such mechanism being located in the single control line and adated to operatively disconnect the portion of the control linkage that is connected between the shift control lever and the throttle cam from the portion of the control linkage that is connected to and influenced by the single control lever, so as to allow the shift control lever and the throttle cam to be returned to their neutral positions when an overload condition is experienced, with FIGS. 12 and 13, which are side elevational and perspective views, respectively, showing the overload relief mechanism in its control line connect position, and with FIGS. 14 and 15, which are side elevational and perspective views respectively, showing such mechanism in its control line disconnect position; and FIGS. 16–18 are fragmentary cross-sectional views respectively showing the mechanism by which the brake is applied in the "neutral" shift position (FIG. 16) and is released in the "up" (FIG. 17) and "down" (FIG. 18) shift positions.

Turning now to a specific consideration of a power driven staging typically incorporating an embodiment of the invention, in FIGS. 1 and 2 the staging illustrated comprises an operator's cage OC having a deck D and mounting a fixed mast or tripod T having at the top thereof a guide or fairlead F through which is led the wire rope or cable C on which the staging is suspended. A winch unit, consisting of a winch drum WD and a gas engine power plant for the same, is mounted on the staging below the deck D and in a winch compartment WC. The suspension cable C extends through the fairlead F and the tripod T and is woven at its lower end upon the power driven winch drum WD.

As will be readily apparent, this type of equipment is operator controlled, and is designed to be suspended along a side of a building, antenna structure, stack, or the like, the operator selectively controlling up and down movement of the equipment while riding in cage OC by means available to him on control panel CP, such control means to be hereinafter specifically described.

Operator's cage OC, tripod T and winch compartment WC are formed by a framework F of high strength aluminum alloy tubing. A skirt S extends around cage OC immediately above the deck D and serves as a toeboard to keep tools or other articles from falling from the staging.

In a single cable suspended staging of the type herein disclosed, safety and reliability of operation are extremely important. In this respect, it is vital that the suspension cable C spool onto the winch drum WD compactly and levelly, that the take-up and let-out of the suspension cable C progress evenly, and that no undue wear of suspension cable C occur. Thus, the winch unit is preferably of the level winding type disclosed and claimed in the above-mentioned U.S. Patent No. 2,998,094.

The novel features characterizing the present invention are typified in the power plant for the winch drum WD. The power plant will now be specifically described with particular reference to FIGS. 3–18 of the drawing.

The power plant comprises a gas engine E, conventional per se, such as a one cylinder, four-cycle, four horsepower internal combustion engine of the type marketed by Briggs and Stratton for example, and further comprises a transmission assembly TA interconnected between the gas engine E and the winch drum WD, and the control mechanism operatively associated with both the gas engine E and the transmission assembly TA for controlling the direction and speed of travel of the staging.

Referring now to FIGS. 3 and 4, a throttle cam 10 is arranged to influence or move a spring loaded cam follower 12 that is operatively connected to a throttle valve (not shown) located in the engine carburetor 14. The throttle cam 10 is connected to control lever 16 on control panel CP, by a push-pull type mechanical linkage generally designated 18.

Cam follower 12 is suitably mounted for reciprocating rectilinear translation in a direction at right angles to the direction of reciprocating rectilinear translation of the throttle cam 10. Cam follower 12 is moved downwardly by the throttle cam 10 to advance the throttle and is moved upwardly by a return spring (not shown) to close the throttle. The return or upward movement of the cam follower 12 is of course also influenced by the position of cam 10, as will become apparent.

As best shown in FIG. 4, the cam surface of the throttle cam 10 includes a horizontal midportion $a$–$b$, constituting the "idle" zone. The cam surface slopes downwardly and outwardly on both sides of the idle zone $a$–$b$ to form "throttle-up" zone $b$–$c$ and "throttle-down" zone $a$–$d$. When cam follower 12 is positioned in the idle zone $a$–$d$, the carburetor throttle is adjusted so that the engine merely runs at idle speed. As is apparent from FIGS. 3 and 4, movement of the throttle cam 10 to the left (as pictured) places cam follower 12 in contact with the sloping "throttle-up" zone $b$–$c$ of the cam surface. Further movement in this direction causes the "throttle-up" position of the cam surface to depress the cam follower so as to open the carburetor throttle. Relative movement of the cam follower 12 through throttle zone $a$–$d$ to the left (i.e., by by movement of the throttle cam 10 to the right) also causes cam follower 12 to be moved in the throttle opening direction. Of course, return movement of the cam follower 12 through each throttle zone $b$–$c$, $a$–$d$ toward the idle zone $a$–$b$ causes spring biased cam follower 12 to move in the throttle closing direction, decreasing the quantity of fuel delivered to the engine E, and hence resulting in a deceleration of the engine E.

In FIGS. 3 and 5 of the drawing, the output shaft 20 of the gas engine E is shown coupled to the input shaft 22 of the reversing transmission 24 by means of a centrifugal clutch 26 of conventional design per se. The idle speed rotation of output shaft 20 is insufficient to cause engagement of the clutch elements for transmitting motion from the engine output shaft 20 to the transmission input shaft 22.

A drive gear 28 is keyed to shaft 22 at 30. As shown in FIGS. 9–11, and shortly to be discussed more specifically, the motion of the drive gear 28 is transmitted to a driven or output gear 32 by either the first or both of a pair of idle gears 34, 36, the said idle gears 34, 36 determining the direction of drive of the driven gear 32. Gear 32 is keyed by key 38 to the output shaft 40 of the transmission 24. The transmission output shaft 40 is drivingly connected by a conventional U-joint 42 and a system of gears in gear box 44 to the winch drum WD.

Gear wheels 34, 36 always engage each other and are mounted together on a radial extension 46 of a cylindrical sleeve 48 that surrounds in concentric fashion and is supported by the cylindrical inner housing 49 for transmission output shaft 40. Gear mounting member 46 is adapted to rotate or rock about the center axis of sleeve 48 so as to bring either gear 34 or gear 36 into mesh with drive gear 28. The distances between the centers of idle gear 34 and driven gear 32, and between idle gear 36 and driven gear 32, are fixed. Idle gear 34 is always in engagement with driven gear 32, while idle gear 36 is never in engagement with driven gear 32.

When idle gear 36 is in mesh with drive gear 28 (FIG. 10), the drive is from gear 28 through gear 36 to gear 34, and then from gear 34 to gear 32. The direction of rotation is changed three times resulting in shaft 40 being driven in a direction opposite to engine output shaft 20. This direction of rotation of shaft 40 causes the suspension cable C to be taken up on the winch drum WD, moving the staging upwardly. When the carrier flange 46 is tilted so as to bring idle gear 34 into mesh with drive gear 28, and remove idle gear 36 from contact with drive gear 28, motion will be transmitted from drive gear 28 through idle gear 34 and thence directly to driven gear 32, remembering that idle gear 34 is always in engagement with driven gear 32. The direction of rotation is changed only twice resulting in shaft 40 being rotated in the same direction as engine output shaft 20. The winch drum WD is rotated oppositely so as to let out the suspension cable C and cause the staging to descend.

Referring now to FIG. 3, as well as to FIGS. 9–11, the reversing transmission 24 is shown as including a shift lever 50 mounted by a shaft 52 to swing between "up" and "down" positions. A crank arm 54 (FIGS. 9–11) is secured to the end of shaft 52 opposite the shift lever 50. The end of crank arm 54 remote from shaft 52 is connected with gear carrier 46 by an adjustable length rod 56. As will hereinafter be explained in more detail as a part of the discussion relating to the operation of the power plant, movement of shift arm 50 in one direction brings idle gear 36 into contact with drive gear 28 so as to wrap the suspension cable C onto winch drum WD and cause the ascent of the staging, while movement of shift lever 50 in the opposite direction brings idle gear 34 into contact with drive. wheel 28, resulting in the suspension cable C being let out, causing the staging to descend.

When shift lever 50 is in the neutral position shown in FIG. 3, neither of the two idle gears 34, 36 is in mesh with the drive gear 28. The reversing transmission 24 is in "neutral" and in addition the brake disk 58, which is keyed to output shaft 40 by key 28, is in friction engagement with the end of sleeve 48, stopping rotation of shaft 40 and winch drum WD, and hence stopping movement of the staging. Thus, movement of the shift lever 50 from an engaged position to its neutral position stops movement of the staging.

The end of mounting sleeve 48 opposite from the radial extension 46 and the idle gears 34, 36 carried thereby is provided with a cam carrying member 60. Brake cam 62 of generally frusto-conical form stands outwardly from member 60, as best shown in FIGS. 16–18. A fixed stop pin 61 pressure fit into the transmission housing 65 functions to limit the extent of pivotal movement of member 60, with projections 63, 63' at the edges of said member 60 striking said pin 61 at the extremities of movement, as respectively shown in FIGS. 17 and 18. A spring loaded and axially adjustable brake actuating pin 64 is threadedly mounted in and extends inwardly from the adjacent wall of the reversing transmission housing 65.

As shown in FIG. 5, and also more particularly in FIGS. 16–18, the relationship of cam 62 with pin 64 is such that when the reversing transmission is engaged and one of the two idle gears 32, 36 is in mesh with the drive gear 28, the pin 64 is out of contact with the cam 62 and the mounting sleeve 48 is displaced toward the pin 64 (as shown in FIGS. 17 and 18), placing the brake disk 58 (FIG. 5) out of frictional contact with the sleeve 48. Thus, during a drive condition, when motion is being transmitted from the drive gear 28 to the driven gear 32, the brake disk 58 is inoperative. When the transmission gearing is in "up" drive position (FIG. 10), sleeve 48 is positively locked away from brake disk 58 by bolt 67, since otherwise the tension on linkage 56 would tend to urge sleeve 48 into engagement with brake disk 58. Bolt 67 stands inwardly from housing 65 and engages a tapered surface 69 or projection 63' when the gearing is in the "up" position as shown at FIG. 17.

When the transmission 24 is shifted to "neutral" by movement of shift lever 50, cam 62 is rotated slightly relative to pin 64, placing the cam 62 in registry with the pin 64 (cf. FIG. 16). Pin 64 is fixed in housing 65, and sleeve 48 is free to move axially as well as rotate relative to mounting member 49. Thus, pivotal movement of sleeve 48 to place the transmission gears in a neutral position is accompanied by an axial displacement of sleeve 48 toward the driven gear 32 by virtue of the contact which cam 62 makes with pin 64. As sleeve 48 moves axially, it in turn moves into engagement with brake disk 58, stopping rotation of transmission output shaft 40.

Referring again to FIG. 3, the control rod 18b is shown extending through an enlarged opening in the free end of shift lever 50. Helical coil compression springs 68, 70 are located on opposite sides of the shift lever 50. Stop members 72, 74 (or more simply "stops") are secured to the control rod 18b outboard of the springs 68, 70, respectively. Motion of the control rod 18b is transmitted to the shift lever 50 through one or the other of the springs 68, 70, as will be specifically described in connection with a discussion pertaining to the operation of the control mechanism.

Throttle cam 10 and shift lever 50 are both connected in series with the control lever 16 through the control members 18a, 18b of control linkage 18. An overload release mechanism 76 divides the control linkage 18 into two parts 18a, 18b. The first part 18a is termed the control lever portion because it is connected directly to the control lever 16. The second part, designated 18b in FIG. 3, is operatively connected to both the throttle cam 10 and the shift lever 50 and is termed the throttle cam and shift lever portion. As will now be explained in connection with FIGS. 12–15, the overload relief mechanism has two positions of operation. The first position is termed its "connect" position (so named because when in this position the overload relief mechanism 76 interconnects and transmits motion between the two control linkage portions 18a, 18b), and a second position termed its "disconnect" position (so named because throttle cam and shift lever portion 18b are then operatively disconnected from the control lever portion 18a and hence from the influence of control lever 16).

The function of the overload release mechanism 76 is to prevent possible breakage of cable C or other destruction of the equipment in the event the staging is in some manner held against upward movement while the power plant is driving the winch drum WD in the up direction. As an example, during use of the staging for cleaning or painting a bridge truss involving a framework of structural members, the fairlead F may run up under and against a projecting structural member and be held thereby. Of course, the gas engine E is still trying to drive the winch drum WD. Since the staging cannot move upwardly along the cable by virtue of its being held by the projecting beam or the like, the motor is overloaded, the drive couplings and shafts of the transmission assembly are stressed, and the suspension cable C is greatly tensioned. If nothing were available to stop the drive of winch drum WD when the overload condition occurs, one or more of the over-stressed components would eventually respond by breaking, and if suspension cable C were to be first to break, the staging would fall, resulting in serious and perhaps fatal injury to the operator and to others who might be working below.

Functionally, the overload relief mechanism 76 senses the overload condition and in response thereto automatically disconnects the throttle cam 10 and the shift lever 50 from the influence of control lever 16. Thereafter the throttle cam 10 is automatically returned to its idle position (by spring 68), whereupon the engine speed reduces and centrifugal clutch 26 disengages, interrupting the drive of the winch drum WD.

In FIGS. 12–15 a typical and therefore non-limitative form of overload relief mechanism 76 is shown to include a cylindrical tubular sleeve 78 forming a housing for a pair of generally cylindrical clutch members 80, 82. Clutch member 80 is formed to include a relatively narrow radial slot 84 and a larger, generally tangential slot 86 in communication therewith. A helical compression spring 88 normally urges clutch member 80 into a position against member 82 (FIGS. 12 and 13) wherein the slot 84 engages a pin 90 projecting upwardly from the lower member 82. Slots 92, 94 cut in the wall of housing 78, accommodate lever arms 96, 98, respectively, constituting portions of the mechanical linkage 18. As shown diagrammatically in FIG. 3, lever arm 96 which extends generally radially from clutch member 80 is connected to linkage part 18a, and lever arm 98, which extends generally radially outwardly from clutch member 82, is attached to control rod 18b.

Movement of control lever 16 causes linkages member 18a to move longitudinally and push on the end of lever 96 so as to rotate clutch member 80. By virtue of the engagement of pin 90 in slot 84, the movement of clutch member 80 is transmitted to clutch member 82, causing lever 98 to swing and in turn either push or pull control linkage portion 18b, depending on the direction of movement of control lever 16.

As best shown in FIGS. 13 and 15, the lower clutch member 82 is provided with an enlarged central bore 100 through which a rod 102, connected at its upper end to the upper clutch member 80, extends. As shown in FIG. 1, rod 102 depends downwardly from the overload relief mechanism 76 and at its lower end contacts the gear box housing 44 to 104. When an overload condition exists, such as previously described, the winch drum WD tends to climb the cable C. When this happens, the gear box 44 is pulled upwardly somewhat (against torque arm 60 shown in the aforesaid U.S. Patent No. 2,998,084), and as it moves gear box 44 lifts rod 102 and hence clutch member 80. When clutch member 80 has been lifted a sufficient amount to move pin 90 out from slot 84 and into the slot 86, the lower clutch member 82 is free to turn independently of the upper clutch member 80 and hence is disconnected from the influence of control lever 16. The control rod 18b is now also free to move independently of the influence of control lever 16 and immediately does so because of the stored energy in spring 68. The upper end portion 106 of rod 102 extends through a bore 108 in the top 110 of housing 78 and serves to keep clutch member 80 centered.

It is important to note that the overload relief mechanism 76, when in the disconnect condition (FIGS. 14 and 15), still functions to transmit "down" control movement of rod 18a to rod 18b, since "down" movement of clutch member 80 brings stop surface 111 into contact with pin 90. This permits the operator to immediately relieve the overload condition simply by changing control lever 16 to its "down" position, and further provides that mechanism 76 is automatically reengaged when the overload is relieved since surface 111 forms one wall of slot 84.

A preferred embodiment of the control lever 16 is shown in FIGS. 6–8. The control housing 112 may be semi-cylindrical in shape, as illustrated. Control linkage member 18a, is suitably a stiff wire or rod, conventional per se, which enters through an opening in the bottom of housing 112 and is connected at its upper end to a cylindrical rack 114. Said control linkage member 18a, as shown at FIG. 1 and in part at FIGS. 6–8, is suitably a so-called flexible cable such as shown at 50 and described in Fageol U.S. Patent No. 2,808,733, and in common usage for remote actuation of throttle and/or choke actuation in similar environments. As will be understood, such control member 18a conventionally includes an anchored housing (as fragmentarily shown in the accompanying FIGS. 6 and 8), wherein the control member 18a moves rectilinearly (as indicated by the accompanying arrow designations in accompanying FIGS. 3 and 8). As will be further understood, such control member 18a is characterized by adequate stiffness to transfer longitudinal movement thereof to the element being controlled (e.g., lever arm 96), yet is sufficiently bendable within its housing to transmit such longitudinal movement along a curved trajectory in its lower portion, such as shown in FIG. 1 and shown schematically in FIG. 3. The control lever 16 is pivotally mounted intermediate its length by spring loaded shoulder bolt 116 and includes an arcuate, toothed inboard portion 118, the teeth 120 of which engage grooves 122 formed in the cylindrical rack 114.

Rack 114 and the toothed inboard portion 118 of control lever 16 are both located inside of an inner housing 124 that is mounted at its ends for horizontal pivotal movement within the control lever housing 112.

The inner housing 124, hereinafter termed the control lever carrier, may be suitably formed by folding a generally diamond shaped piece of sheet metal, trimmed to possess the end configuration shown in FIG. 8, about itself longitudinally so as to form a pair of generally parallel side walls 126, 128 and an interconnecting bight portion 130. The control lever carrier 124 is equipped at its upper and lower ends 132, 134, respectively, with suitable trunnion means, mounting it for sidewise pivotal movement in housing 112. The bolt 116 for control lever 16 extends through and is carried by the side walls 126, 128. Bolt 116 can be adjusted to be relatively tight, in which condition control rod 16 will stay at any set control condition, or can be relatively loose, in which condition the control lever 16 automatically returns to neutral unless held. This latter condition provides so-called "dead man" control, a safety feature often required in this type of equipment.

A horizontal slot 136, cut in the front face of the control lever housing 112, accommodates the handle portion of control lever 16 as the same is moved from one or the other of a pair of laterally spaced sets of vertical control slots 138, 140.

Operator movement of the handle portion of lever 16 from side to side in slot 136 pivotally moves the control lever carrier 124 about its end mountings and circumferentially moves the teeth 120 in the grooves 122 of the cylindrical rack 114 which remains stationary.

As will be apparent, movement of the control lever 16 upwardly into the "up" marked portion of either set 138, 140 of the control slots causes the cylindrical rack 114 and the control member 18a attached thereto to be pushed downwardly, and downward movent of control lever 16 into a "down" slot of one of the sets of control slots causes the cylindrical rack 114 and the control member 18a to be pulled upwardly.

The horizontal slot 136 interconnects the neutral portions of the vertical control slots so that the control lever 16 can be conveniently operated by an operator standing at either side of the staging. Hence, the control lever handle can be moved from one set of control slots to the other only when the transmission is in neutral and the engine is idling.

An ignition cutout switch 142 may be located inside the control lever housing 112 above the midportion of horizontal slot 136, as illustrated. As shown in FIGS. 6 and 8, the face of the control lever housing 112 is cut out at 144 above the horizontal slot 136 and radially in line with the switch actuator 146. Movement of the control lever 16 into the cutout 144 causes it to contact and displace the switch actuator 146. Switch 134 is a part of the ignition circuit of the engine E and when it is actuated by the control lever 16 in the manner just described it grounds the ignition circuit, stopping the engine.

In operation, with the control lever 16 in its neutral position, and hence with the transmission 24 also in neutral and the throttle cam 10 in idle position (FIG. 3), the ignition system (not shown) is energized and the engine is cranked to start the engine.

The engine E will first idle, and at idling speed the centrifugal force developed by the engine output shaft 20 is insufficient to engage the centrifugal clutch 26. In the transmission 24 the drive gear is stationary, and neither idle gear 34 nor idle gear 36 is in engagement with the drive gear 28. Also, the brake disk 58 on output shaft 40 is engaged by sleeve 48.

When the operator desires to move in the up direction, for example, he first moves the control lever 16 horizontally in slot 136, then into one of the vertical slots 138, 140 marked "up." Initial movement of the control lever in an "up" slot moves the push-pull control rod 18a which in turn causes the throttle cam and shift lever portion 18b of the control linkage to be displaced to the left, as shown in FIG. 3. As stop 72 moves, it pushes against spring 68 which in turn pushes on shift lever 50, swinging it to the left and causing cam carrying member 60 on the idle gear mounting sleeve 48 to rotate so as to release the brake disk 58 and cause the engagement of idle gear 36 with drive gear 28. Simultaneously the throttle cam 10 is displaced to the left but, as diagrammatically depicted in FIG. 4, the throttle cam 10 moves only in the idle zone a–b during the shifting phase.

Only a portion of the total or available movement of control lever 16 is required to engage the transmission gears. Any additional movement of the control lever 16 and hence the control linkage 18 is for the purpose of increasing the amount of fuel. When shift lever 50 has been moved as far as it will go, upon additional movement of the control lever 16, the coil spring 68 is compressed between stop member 72 and the now immovable shift lever 50. The throttle cam 10, however, is moved further to the left, putting the "throttle up" portion b–c of the cam surface in contact with the cam follower 12. The displacement of cam follower 12 and hence the amount of throttle advance is proportional to the movement of throttle cam 10 by the control lever 16 through the intermediacy of the control members 18a, 18b. As the throttle is advanced the engine speed is increased, causing the engagement of cenrifugal clutch 26 and thus the drive of which drum WD for moving the staging mechanism upwardly. As is obvious, the speed of travel can be progressively increased until the throttle cam 10 has traveled its full extent.

When it is desired to stop vertical movement of the staging mechanism, the control lever 16 is vertically returned to its neutral position. The throttle cam 10 is immediately returned to its idle position (FIG. 3) by the vertical movement of the control lever 16 to neutral, with the engine substantially immediately decelerating to idle speed. The response of shift lever 50 to the movement of control lever 16 is slower than the throttle response. Initial movement of the control rod 18b to the right merely relieves spring 68, and normally it is not until throttle cam 10 has returned to its idle position and the engine has been idling for a moment that the shift lever 50 is moved by the control linkage to neutral. At the same time, the rotational movement of idle gear mounting member 46 to disengage idle gear 36 from drive gear 28 is accompanied by an axial displacement of the mounting sleeve 48, owing to movement of brake cam 62, operating the brake 58 and stopping the motion of driven gear 32 and the transmission output shaft 40.

When it is desired to move the staging mechanism downwardly, the control lever 16 is moved into one of the vertical slots marked "down." When the shift lever 50 is moved in the down direction it causes engagement of idle gear 34 with drive gear 28, reversing the direction of drive of winch drum WD and causing the staging mechanism to descend. In other respects, the operation of the throttle and shift control mechanism in the down direction is the same as occurs in the up direction described above.

In the event the staging mechanims is in some manner restrained against movement while the engine is trying to drive such staging mechanism upwardly, the overload release mechanism 76 responds in the previously described manner to disconnect shift lever 50 and throttle cam 10 from the influence of control lever 16. Immediately thereafter the control cam 10 automatically returns to its idle position under the influence of spring 68, and the engine is automatically decoupled from winch drum WD as a result of disengagement of centrifugal clutch 26.

The overload release mechanism 76 stays in the disconnect position shown in FIGS. 14 and 15 until the control lever 16 is repositioned and the overload relieved to reengage pin 90 in slot 84.

When the operator desires to stop the gas engine E, he moves the control lever 16 to the center of horizontal slot 136. Thence the control lever 16 is moved upwardly into the semi-circular cutout 144 where it engages and actuates the shutoff switch 142, which grounds the engine ignition circuit.

Although the single lever throttle and shift control mechanism of the present invention has been illustrated in conjunction with the gas engine power plant of a suspended staging, it is readily apparent that such control mechanism has general application and can be used in other installations wherein it is desired to have both the throttle and shift phases of the engine operation governed by a single control lever. Typical of such other installations are marine power plants and stationary winches, for example. It is also readily apparent that in other installations wherein the operator is more remote from the power plant that the principles of the present invention can still be taken advantage of by employing a more intricate system of mechanical linkage between the control lever 16 and the control rod 18b. Alternatively, the control rod 18b can be adapted to be actuated by means of a bi-directional solenoid or fluid motor connected directly to the control rod 18b and located in the the vicinity of the power plant and remotely controlled by control means located in the vicinity of the operator and operatively connected to the solenoid or fluid motor by appropriate electrical or fluid circuitry, whichever the case may be. In such other installations, the directions of movement may be "forward" and "reverse" rather than "up" and "down."

From the foregoing, various other component arrangements and modes of utilization of the throttle and shift control mechanism characteristic of the invention will be apparent to those skilled in the art to which the invention is addressed, within the scope of the following claims.

What is claimed is:

1. A single lever throttle and shift control mechanism for an engine having a reversing transmission, said mechanism comprising: a control lever; throttle control means; a gear shifting lever for shifting said transmission; and a control linkage connecting said control lever to said throttle control means and said gear shifting lever, said control linkage including resilient means enabling limited relative movement in that portion of said linkage between said gear shifting lever and said throttle control means.

2. A single lever throttle and shift control mechanism for an engine having a reversing transmission, said mechanism comprising: a control lever; throttle control means; a gear shifting lever; a control linkage portion normally connecting said control lever to said throttle control means; and a control linkage portion interconnecting said throttle control means and said gear shifting lever, such latter control linkage portion comprising spring means enabling limited relative movement between said throttle control means and said gear shifting lever yet also operatively interconnecting said throttle control means and said gear shifting lever to cause gear shifting movement of such lever.

3. A control mechanism according to claim 2, further comprising an engine overload sensing means in the first said controlling linkage portion, operating to disconnect said control lever from said throttle control means on the occasion of engine overload.

4. A control mechanism according to claim 3, wherein said spring means is arranged to be maintained in a stored energy condition when said gear shifting lever is in gear engaged position and said throttle control means its in substantially full throttle position, such stored energy condition of said spring means operating to automatically return said throttle control means to engine idling position on the occasion of said overload sensing mechanism disconnecting said control lever from said throttle control means.

5. A single lever throttle and shift control mechanism for an engine comprising: a control lever; a throttle cam mounted for reciprocating rectilinear movement, said throttle cam having a cam face oriented generally at a right angle to the direction of cam movement; cam follower means contacting said cam surface and arranged to be influenced thereby so as to operate a throttle during certain periods of throttle cam movement; gear shifting lever means mounted for pivotal movement and arranged to operate a reversing transmission when so moved; and a single mechanical linkage connecting the control lever to the throttle cam and to the gear shifting lever means, said mechanical linkage including a resilient element operatively connected to said gear shifting lever means to permit movement of said throttle control means independently of said gear shift lever means.

6. A single lever throttle and shift control mechanism for an engine comprising: a control lever; throttle control means; gear shifting lever means mounted for pivotal movement and arranged to operate a reversing transmission when so moved; a control linkage connecting the throttle control means to the control lever; and spring means interconnecting said control linkage and the gear shifting lever means, said throttle control means operatively maintaining the throttle in an engine idling position during initial movement of the control lever, said initial movement of the control line being transmitted through the spring means to the gear shifting lever means to pivotally move the same and shift the transmission, said gear shifting lever means being constructed to come to a position of rest after shifting is completed, and said spring means being constructed to be compressed upon additional movement of the control lever to advance the throttle.

7. In combination, an engine including a throttle and an output shaft; reversing transmission means having input and output shafts and forward, reverse and neutral positions, centrifugal clutch means interconnecting the engine output shaft and the transmission input shaft; and a single lever throttle and shift control mechanism for said engine and said reversing transmission, said control mechanism comprising a control lever, throttle control means operatively connected to the engine throttle, a gear shifting lever for shifting the transmission, and control linkage means connecting the throttle control means and the gear shifting lever together and to said control lever, said throttle control means operatively maintaining the throttle in idle position during a gear shifting movement of the gear shifting lever, and said centrifugal clutch operatively disengaging the engine output shaft to the transmission input shaft when the engine is idling.

8. The combination of claim 7, wherein the throttle control means is configured to advance the throttle upon additional movement of the control lever after shifting has been completed.

9. The combination of claim 7, further including brake means operatively associated with the transmission output shaft to brake any movement of the transmission output shaft when the reversing transmission is shifted into neutral.

10. The combination of claim 9, comprising means releasing said brake means when the transmission is in neutral.

11. In combination, an engine including a throttle and an output shaft; a reversing transmission having an input shaft, a drive gear on said input shaft, an output shaft, a driven gear on said output shaft, and movable idle gear means mounted for selective engagement or disengagement with said drive and driven gears to establish forward drive, reverse drive and neutral conditions of said transmission; means interconnecting the engine output shaft and the transmission input shaft during driving of the transmission by the engine; and a single lever throttle and shift control mechanism for said engine and said reversing transmission, said control mechanism comprising a control lever, throttle control means operatively connected with the engine throttle, a gear shifting lever operatively connected with the idle gear means for moving the same for shifting the transmission, and a single control linkage connecting the throttle control means and the gear shifting lever together and to the control lever, said throttle control means operatively maintaining the throttle in an engine idling position during gear shifting movement of the gear shifting lever.

12. The combination of claim 11, wherein the throttle control means advances the throttle upon additional movement of the control lever after gear shifting movement of the gear shifting lever from neutral to either forward or reverse has been completed.

13. The combination of claim 11, wherein the means interconnecting the engine output shaft and the transmission input shaft during driving of the transmission comprises centrifugal clutch means when the engine is idling, the disengagement of the centrifugal clutch means being in response to a relatively low rotational speed of the engine output shaft.

14. The combination of claim 11, such combination further including brake means engaged to stop rotation of the said driven gear and hence the transmission output shaft when the transmission is in neutral, and disengaged to permit rotation of said output shaft when the transmission is shifted from neutral to either forward to reverse.

15. A single lever throttle and shift control mechanism for an engine assembly comprising: a control lever; throttle control means; gear shifting means; and a single control linkage normally interconnecting said control lever, said throttle control means and said gear shifting means; said control linkage including a first part connected to the control lever, a second part connected with said throttle means and said gear shifting means, and an overload relief mechanism normally connecting said first and second parts together, but constructed to decouple the second part from the first part, and hence the gear shifting means and the throttle control means from the influence of the control lever, in response to an overload condition of the engine assembly, means for sensing an overload condition of the engine assembly and in response thereto actuating the overload relief mechanism, means for automatically returning the throttle control means to an engine idling position when such is disconnected from the influence of the control lever.

16. In combination, a combustion engine having a throttle operable between idle and open positions; a transmission having neutral and drive positions and including a shifting lever; and a throttle and shift control mechanism comprising a throttle cam, guide means mounting said throttle cam for straight line movement, said throttle cam having a cam surface formed to include an elongated straight portion extending substantially parallel to the line of throttle cam movement, and a sloping portion intersecting and forming an obtuse angle with said straight portion, cam follower means in contact with said cam surface and operatively connected to said engine throttle, and operator influenced control means constructed to initially move the throttle cam and shifting lever in unison when shifting from neutral to drive position, said shifting lever shifting the transmission to drive position in response to such initial movement, said straight portion of the cam surface contacting the cam follower throughout such initial movement of the throttle cam, with said cam follower means in turn maintaining the engine throttle in an idling position, said sloping portion of the cam surface contacting the cam follower means during initial movement of the throttle cam and displacing said cam follower means, with said cam follower means opening the engine throttle in response to such displacement and in proportion to such additional movement of the throttle cam.

17. The combination of claim 16, wherein the operator influenced control means operatively maintains the shifting lever and hence the transmission in drive position during return movement of the throttle cam to a position wherein the cam follower again is in contact with the straight portion of the cam surface, putting the engine throttle in an idling position, said control means also operatively moving the shifting lever to shift the transmission from drive to neutral during additional return movement of the throttle cam, with said straight portion of the cam surface contacting the cam follower means during such additional return movement, causing the said cam follower means to maintain the engine throttle in engine idling position.

18. The combination of claim 16, further including clutch means between said engine and said transmission, said clutch means decoupling the transmission from the engine when the engine is idling and coupling the transmission to the engine to be driven thereby after the transmission has been shifted to drive position and the throttle cam is being moved to open the throttle.

19. The combination of claim 16, wherein the transmission further includes an output shaft and brake means operable when said transmission is in neutral to brake movement of said output shaft, but to release said output shaft for rotation when the transmission is in drive position.

20. A throttle control mechanism for an engine assembly arranged to drive a mobile carriage, said throttle control mechanism comprising: a manual control lever; throttle control means; and a single mechanical linkage normally interconnecting said control lever and said throttle control means so that said throttle control means is normally moved by movement of the control lever, said control line including a first part connected to the control lever, a second part connected with said throttle means, and an overload relief mechanism normally connecting said first and second parts together, but constructed to disconnect the second part from the first part, and hence the throttle control means from the influence of the control lever, in response to an overload condition of the engine, and means for sensing an overload condition of the engine assembly and in response thereto actuating the overload relief mechanism.

21. In a power driven suspended staging comprising a frame having an operator's support, a cable from which the staging is suspended, a winch drum on which said cable is wound and unwound to raise and lower said staging, reduction gearing for driving said winch drum, a reduction gearing housing having a portion thereof movable with respect to said frame responsive to application of a predetermined amount of torque to said winch drum by said cable, an engine for driving said reduction gearing, means coupling said engine to said reduction gearing only when the engine is operating above a predetermined speed, speed control means for said engine, and manually actuatable linkage for operating said speed control means, the said linkage including an overload relief mechanism responsive to movement of said reduction gear housing and acting to decouple portions of said linkage on the occasion of said torque exceeding said predetermined amount, the said manually actuatable linkage further including means automatically reducing engine speed to less than said predetermined speed on such occasion, thereby interrupting the drive of said winch drum.

(References on following page)

References Cited by the Examiner

UNITED STATES PATENTS

| | | | |
|---|---|---|---|
| 1,895,722 | 1/1933 | McLearn | 74—472.2 |
| 2,067,848 | 1/1937 | Hnizdo | 74—472.2 |
| 2,353,137 | 7/1944 | Banker | 192—105 |
| 2,808,733 | 10/1957 | Fageol | 74—472.2 |
| 2,967,436 | 1/1961 | Steinlein | 74—472.2 |
| 2,998,094 | 8/1961 | Fisher | 182—142 |

HARRISON R. MOSELEY, *Primary Examiner.*

REINALDO P. MACHADO, *Examiner.*